United States Patent [19]

Kinoshita et al.

[11] Patent Number: 4,890,505
[45] Date of Patent: Jan. 2, 1990

[54] STRUCTURE OF TELESCOPIC STEERING APPARATUS FOR A VEHICLE

[75] Inventors: Satoshi Kinoshita; Shyogo Kachi; Yoshiyuki Shimizu, all of Shizuoka, Japan

[73] Assignee: Fuji Kiko Company, Limited, Tokyo, Japan

[21] Appl. No.: 173,190

[22] Filed: Mar. 25, 1988

[30] Foreign Application Priority Data

Mar. 27, 1987 [JP] Japan ............................ 62-46118[U]
May 30, 1987 [JP] Japan ............................ 62-83304[U]

[51] Int. Cl.4 ............................................ B62D 1/18
[52] U.S. Cl. ...................................... 74/493; 74/531
[58] Field of Search .................... 74/493, 531; 280/775

[56] References Cited

U.S. PATENT DOCUMENTS

| | | | |
|---|---|---|---|
| 2,910,887 | 11/1959 | Helms | 74/493 |
| 4,240,305 | 12/1980 | Denaldi et al. | 74/493 |
| 4,598,604 | 7/1986 | Sorsche et al. | 74/493 |
| 4,602,520 | 7/1986 | Nishikawa et al. | 74/493 |
| 4,648,624 | 3/1987 | Mouhot et al. | 280/775 |

FOREIGN PATENT DOCUMENTS

| | | |
|---|---|---|
| 1094121 | 12/1960 | Fed. Rep. of Germany . |
| 2610139 | 9/1977 | Fed. Rep. of Germany . |
| 2408500 | 8/1979 | France . |
| 2008664 | 6/1979 | United Kingdom . |

Primary Examiner—Allan D. Herrmann
Attorney, Agent, or Firm—Bachman & LaPointe

[57] ABSTRACT

A structure of a telescopic steering apparatus for a vehicle, in which a pair of clamping numbers and a guide member for guiding the pair of clamping members to an inner tube are provided for fixing and unfixing the inner tube constituting a telescopically movable portion of a column jacket to an upper jacket constituting a fixed portion so that a rigidity of a steering shaft is improved when the telescopically movable portion of the column jacket is extended to a maximum position. In addition, a guide member and alleviator are fitted around inner and outer peripheral surfaces of the upper jacket and inner tube so that when the inner tube is drawn into the upper jacket, a shock upon collision of the inner tube and upper jacket is damped.

20 Claims, 20 Drawing Sheets

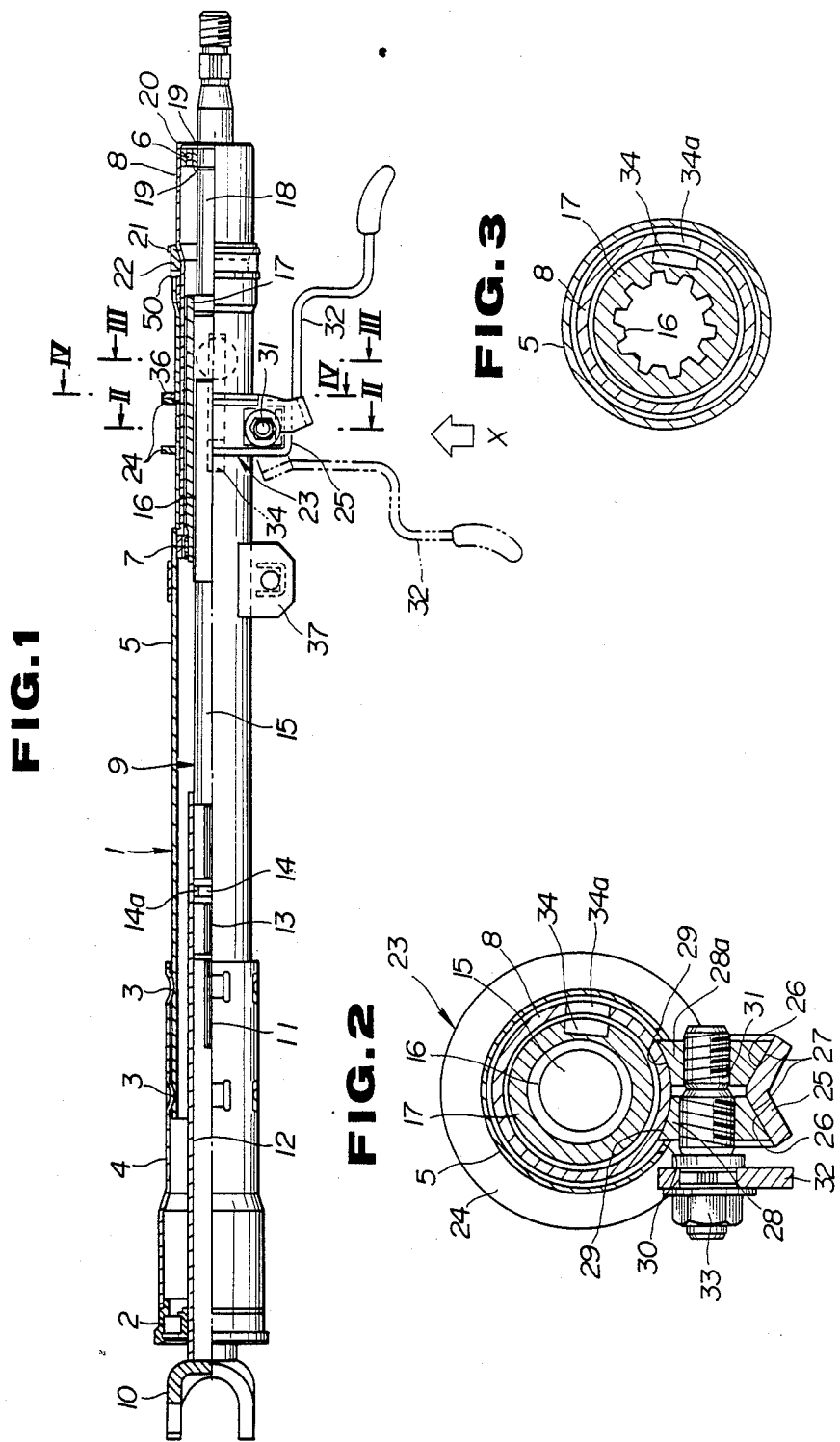

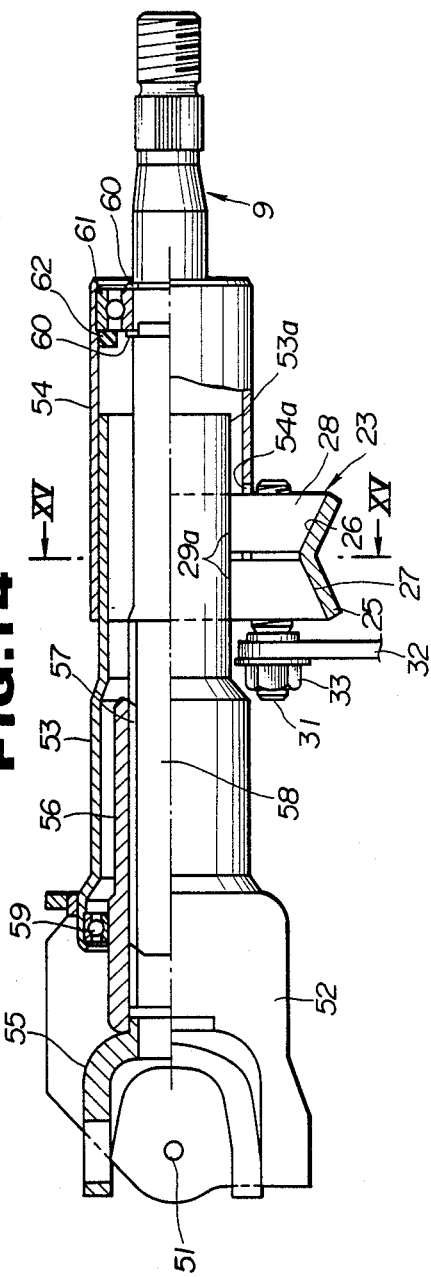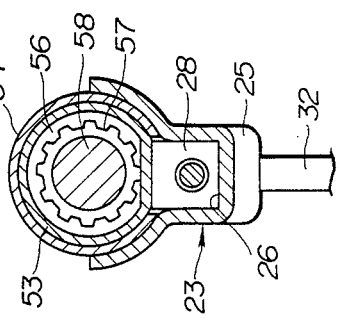

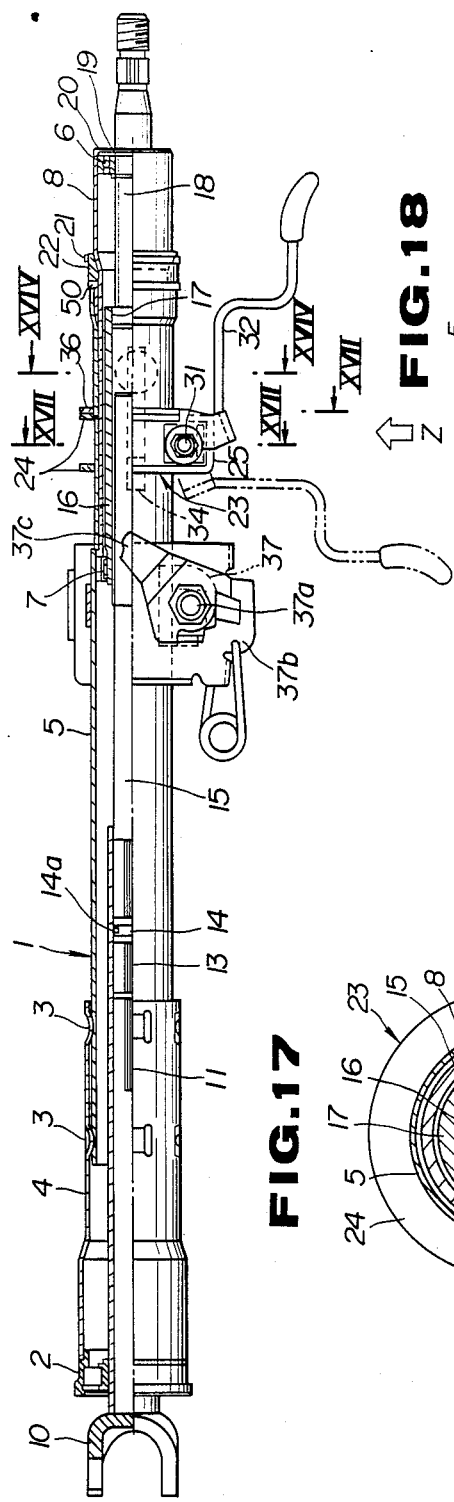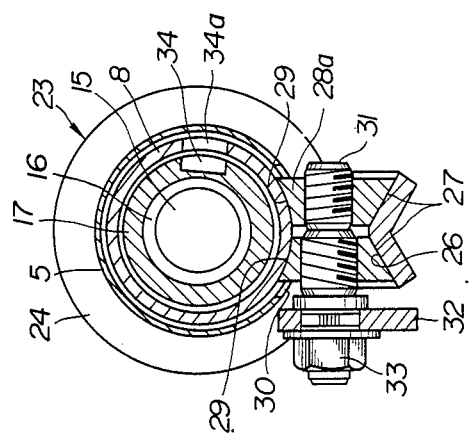

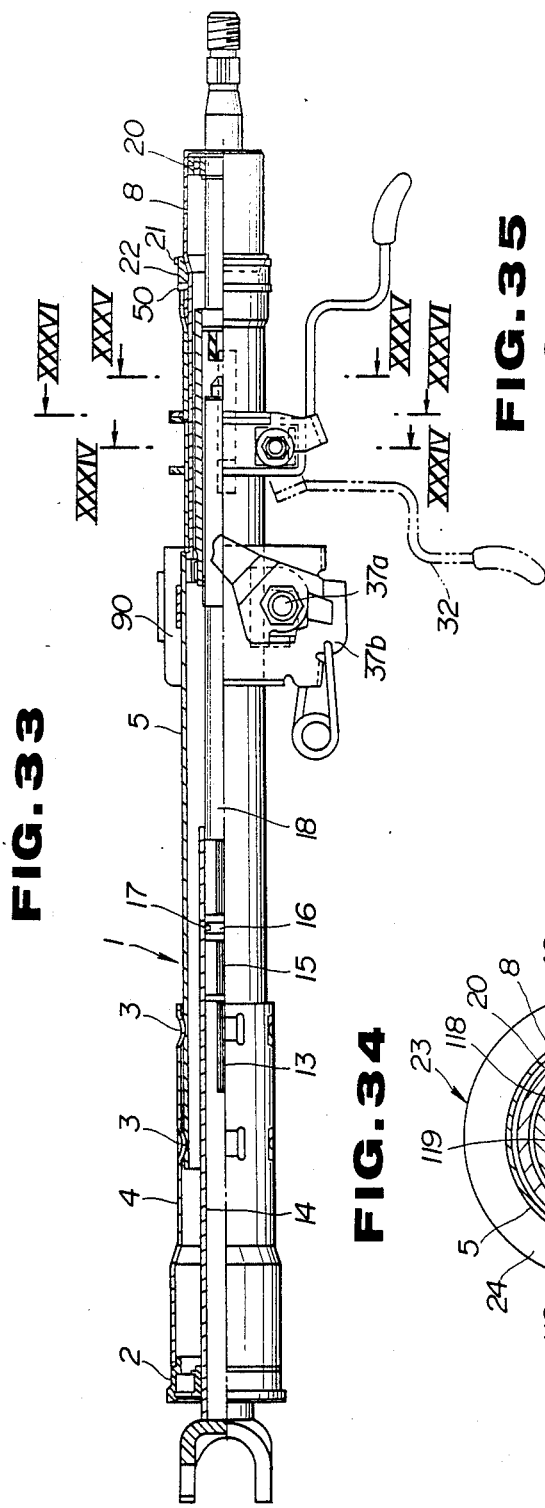
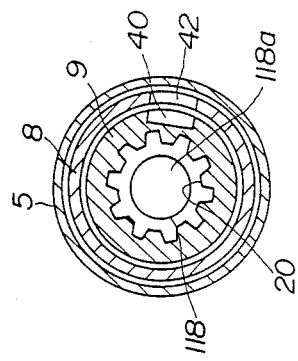
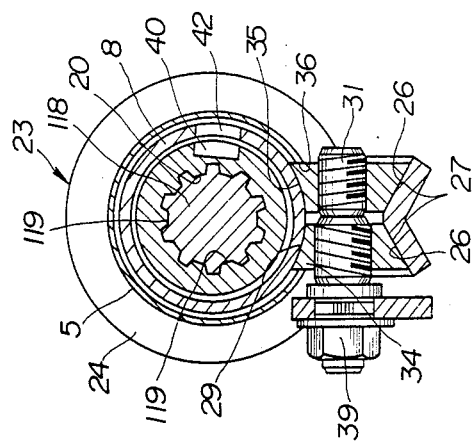

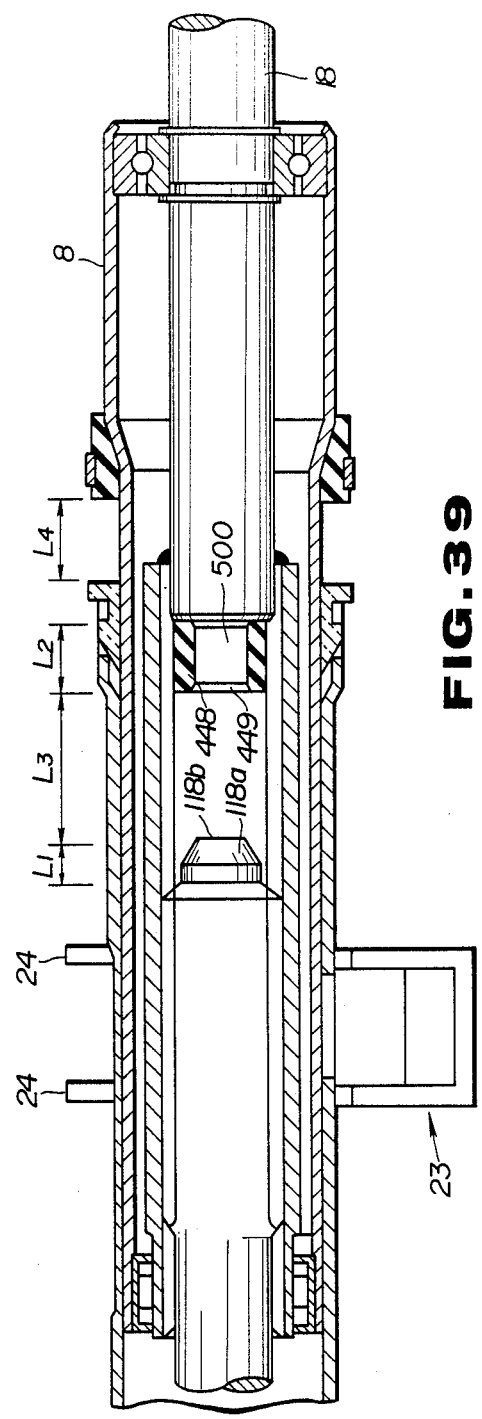
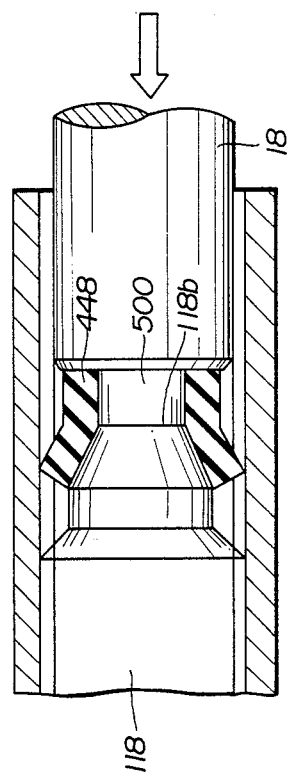

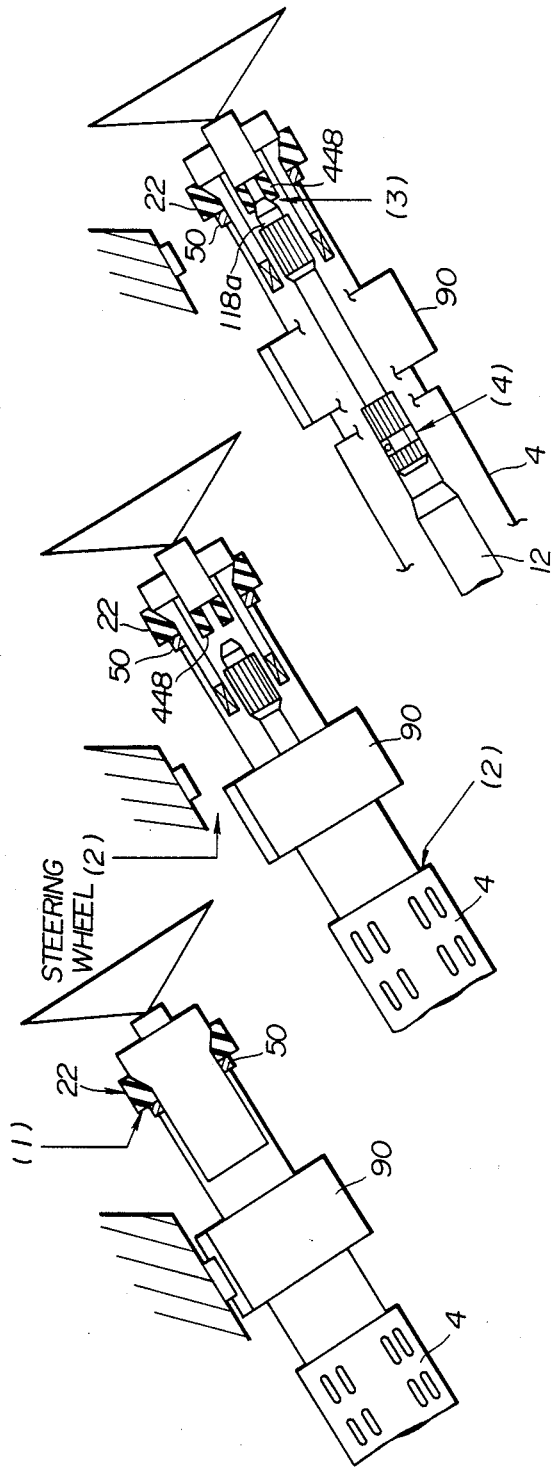

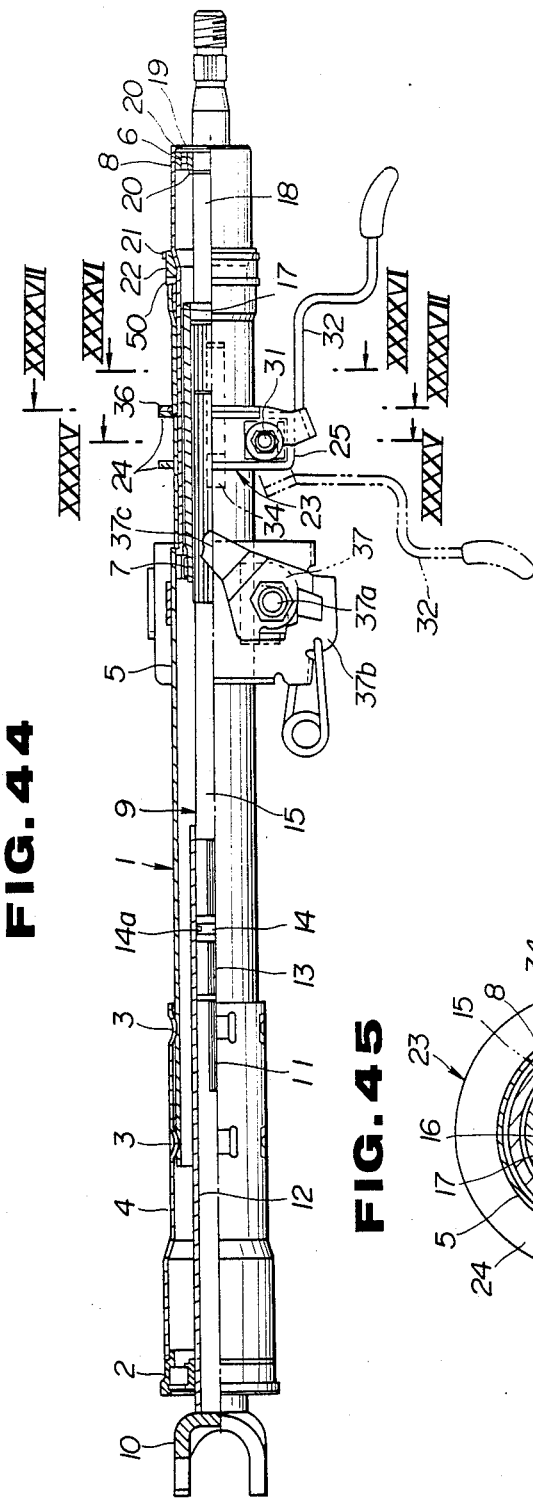
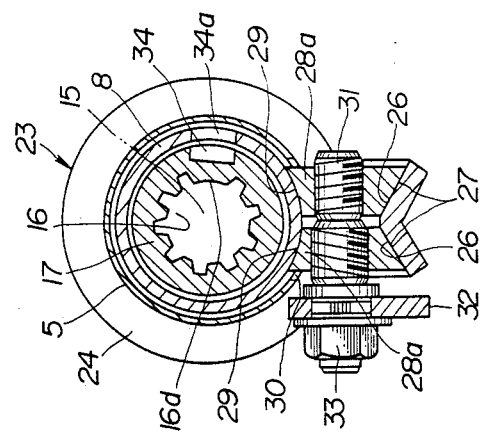
FIG. 44
FIG. 45

STRUCTURE OF TELESCOPIC STEERING APPARATUS FOR A VEHICLE

BACKGROUND OF THE INVENTION (1) Field Of the Invention

The present invention relates to a structure of telescopic steering apparatus applicable to a vehicle, in which a steering shaft of a steering column onto which a steering wheel is fixed is telescopically movable in an axial direction of the steering shaft.

(2) Background Of the Art

Recent automotive vehicles have adopted tilt-type and/or telescope-type steering apparata in order to assure adjustments of optimum driving positions for vehicle drivers.

In the telescope-type (telescopic) steering apparata, steering shafts are telescopically movable in steering column jackets within constant limits of movements.

The steering shaft in the telescopic steering apparatus includes a cylindrical shaft and shaft body engaged together via a spline. The steering wheel is axially fixed to a free end of the shaft body. The shaft body can manually or electrically be inserted into or separated from the cylindrical shaft. In the former manually operable type shaft body, a lock portion for fixing both shaft body and cylindrical shaft members together is additionally installed.

On the other hand, in the tilt-type steering apparata, an upper end of the steering column jacket is supported on a clamp fixed to a vehicle body via a movable bracket with a tit hinge as a center so that the steering wheel can be pivoted in the upward and downward directions.

In addition, combination-type steering apparata of both tilt-type (tiltable) and telescope-type structures have recently been adopted in many automotive vehicles.

However, since in the previously proposed telescopic steering apparata the cylindrical shaft is axially fitted to the shaft body in the axial direction, a rigidity of the steering shaft tends to be reduced if the axis body is extended from the cylindrical shaft at its maximum length.

In addition, when the shaft body is drawn at its maximum into the cylindrical shaft after the maximum extension of the shaft body from the cylindrical shaft, an upper end of an upper jacket of the steering column jacket often collides violently with an upper end of an inner tube so that an abnormal sound of shock is produced. The telescopic steering shaft may be damaged and vehicle occupants feel unpleasantly.

To cope with such collisions, nonmetallic stoppers are installed on the upper end portion of the upper jacket and upper tube of the column jacket, respectively, so that the collision of both members can be damped.

However, since such kinds of stoppers are made of plastically deformable members such as synthetic resins, they are susceptible to be damaged. Hence, the structures of the whole stoppers tend to become complex, large-sized, and heavy in weight to endure a certain magnitude of shock upon collision. Consequently, the manufacturing cost becomes increased.

SUMMARY OF THE INVENTION

It is therefore an object of the present invention to provide a cost effective, light-weight and relatively simple telescopic steering apparatus for a vehicle which assures rigidity of a steering shaft in a case when a shaft body is extended at its maximum limit from a cylindrical shaft and relieves a shock upon collision of both upper ends of the upper jacket and inner shaft, e.g., when the steering column is telescopically adjusted.

The above-described object can be achieved by providing a structure of a telescopic steering apparatus, comprising: (a) a steering column jacket having a first fixed portion and a second movable portion which is linked to the first portion and is movable in an axial direction thereof., (b) a steering shaft having a third portion rotatably fitted to the first fixed portion of the column jacket and fourth portion which is linked to the third portion and is movable in the axial direction of the column jacket within a predetermined range of movement, (c) first means for operatively fixing and unfixing the second portion to the first portion., and (d) second means fixed to the first portion for guiding the first means to the second portion via the first portion.

BRIEF DESCRIPTION OF THE DRAWINGS

FIG. 1 is a side partially cross sectional view of a telescopic steering apparatus in a first preferred embodiment according to the present invention.

FIG. 2 is a cross sectional view of the telescopic steering apparatus cut away along the line II—II of FIG. 1.

FIG. 3 is a cross sectional view of the telescopic steering apparatus cut away along the line III—III of FIG. 1.

FIG. 14 is a partially cross sectional side view of the telescopic steering apparatus in a third preferred embodiment according to the present invention.

FIG. 15 is a cross sectional view of the telescopic steering apparatus cut away along the line XV—XV of FIG. 14.

FIG. 16 is a partially cross sectional side view of the telescopic steering apparatus in a fourth preferred embodiment according to the present invention.

FIG. 17 is a cross sectional view of the telescopic steering apparatus cut away along the line XVII—XVII of FIG. 16.

FIG. 18 is a cross sectional view of the telescopic steering apparatus cut away along the line XVIII—XVIII of FIG. 16.

FIG. 33 is a partially cross sectional view of the telescopic steering apparatus in a seventh preferred embodiment according to the present invention.

FIG. 34 a cross sectional view of a part of the steering apparatus cut away along a line XXXIV—XXXIV of FIG. 33.

FIG. 35 is a cross sectional view of the steering apparatus cut away along a line XXXV—XXXV of FIG. 33.

FIGS. 38 and 39 are explanatory sectional views for explaining an operation of the steering apparatus shown in FIG. 33.

FIG. 42 (A) to 42 (C) are consecutive explanatory views for explaining the operation of the steering apparatus.

FIG. 44 is a partial sectional view of the steering apparatus in an eighth preferred embodiment according to the present invention.

FIG. 45 is a cross sectional view of a part of the steering apparatus cut away along a line XXXXV—XXXXV of FIG. 44.

DETAILED DESCRIPTION OF THE PREFERRED EMBODIMENTS

Figure 4:
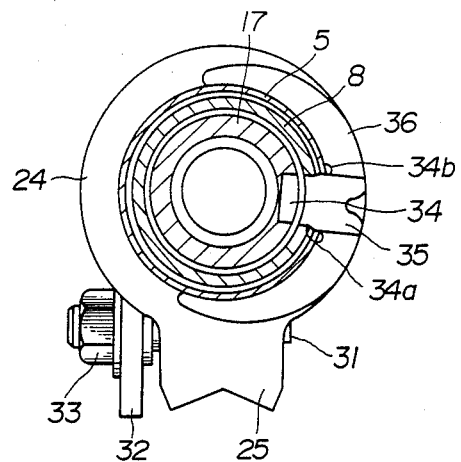
FIG. 4 is a cross sectional view of the steering apparatus cut away along the line IV—IV of FIG. 1.
Figure 5:
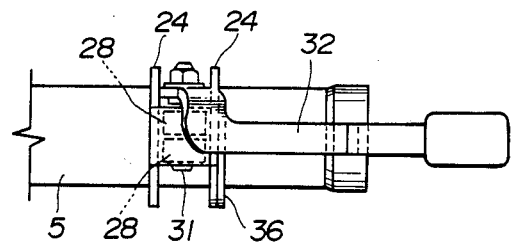
FIG. 5 is a partial view of the telescopic steering apparatus as viewed from an arrow-marked direction X.

Reference will hereinafter be made to the drawings in order to facilitate understanding of the present invention.

FIRST PREFERRED EMBODIMENT

FIGS. 1 to 5 show a first preferred embodiment of a telescopic steering apparatus according to the present invention.

A column jacket generally denoted by 1 includes a lower jacket 4, an upper jacket 5, and an inner tube 8, as shown in FIG. 1.

The lower jacket 4 has one end into which a bearing 2 is closely fitted and has the other end provided with mutually spaced-apart recess portions 3. The upper jacket 5 has one end fitted into the recess portions 3 of the lower jacket 4 so as to enable insertion thereof under pressure into the recess portions 3 in its axial direction of the column jacket 4. The inner tube 8 is fitted into the other end of the upper jacket 5, is movable in the axial direction, and has inner peripheral portions of both ends thereof to which bearings 6 and 7 are respectively fixed.

A steering shaft 9 is arranged along an axial line of the column jacket 1. In addition, the steering shaft 9 is rotatably and telescopically inserted in the axial direction of the column jacket 1. The steering shaft 9 includes a cylindrical shaft 12, a shaft body (lower shaft) 15, a cylindrical shaft 17, and a shaft body (upper shaft) 18. The cylindrical shaft 12 has one end to which an universal joint 10 is linked and the other end whose inner periphery is provided with a serration 11 inscribed thereon.

The shaft body 15 has one end on which a serration 11 and peripheral groove 14 are inscribed. Both of the serration 11 and groove 14 are engaged with the serration 11, a ball 14a is inserted into the peripheral groove 14, and the peripheral groove 14 is inserted into the other end of the cylindrical shaft 12. The cylindrical shaft 17 is movably inserted in its axial direction via a spline portion 16. The cylindrical shaft 17 and shaft body 18 are integrated and coaxially inserted into the tube 8. Both cylindrical shaft 17 and shaft body 18 are rotatable via the bearing 6 with the axis of the column jacket 1 as a center and are movably inserted in the axial direction thereof within a range of length of the spline portion 16. The bearing 7 is fixed by means of a snap ring 19 and a bending portion 20 of the inner tube 8. Consequently, the inner tube 8 and shaft body 18 are integrated and are movable in the axial direction.

It is noted that a steering wheel (not shown) is axially attached to a free end of the shaft body 18.

In addition, an alleviator 22 made of an elastic material such as rubber or urethane is tightly fitted to an outer periphery of a free end of the inner tube 8.

A guide member (bracket) 23 is fixed to an outer periphery surface of the inner tube 8 located in a vicinity of the upper end of the upper jacket 5.

The guide member 23 includes two pieces of flange-shaped portions 24 for fitting the upper jacket 5 thereto, a pair of groove-shaped portions 25 integrally fixed to the two pieces of flange-shaped portions 24, and a pair of tapered surfaces 26, 26 formed so as to face the inner bottom surfaces of the flange-shaped portion 25. In the guide member 23, a pair of clamping members 28, 28a having the same tapered surfaces 27, 27 as the above-described tapered surfaces 26, 26 are inserted in a direction orthogonal to an axial line of the column jacket 1. Both tapered surfaces 26, 26 and 27, 27 are slidably contacted with each other. Upper end surfaces of the clamping member 28, 28a are provided with curved surfaces 29, 29 faced toward the tapered surfaces 27, 27. Furthermore, the curved surfaces 29, 29 are penetrated through a cut-out hole 30 of the upper jacket 5 and are slidably contacted with the inner tube 8. A screw 31 having a clockwise turnable threaded half portion and a counterclockwise turnable threaded half portion is penetrated into the pair of clamping members 28, 28a. A pivotally operable member 32 such as a lever or knob is fixed by means of a nut 33.

It is noted that to prevent the rotation of the inner tube 8 of the column jacket 1, an elongated hole 34a is provided in the inner tube 8 opposite to a key lock groove 34 of the cylindrical shaft 17 and a slit-shaped hole 34b is provided in the upper jacket 5.

An E-ring shaped lock member 36 having a projection 35 projected from the slit-shaped hole 34b to an elongated hole 34a is attached to the upper jacket 5. Numeral 37 shown in FIG. 1 denotes one of the members for supporting the column jacket 1 on the vehicle body.

SECOND PREFERRED EMBODIMENT

FIGS. 6 to 13 show a second preferred embodiment of the telescopic steering apparatus according to the present invention.

The explanations of the same elements as those described in the first preferred embodiment are omitted here.

Figure 10:
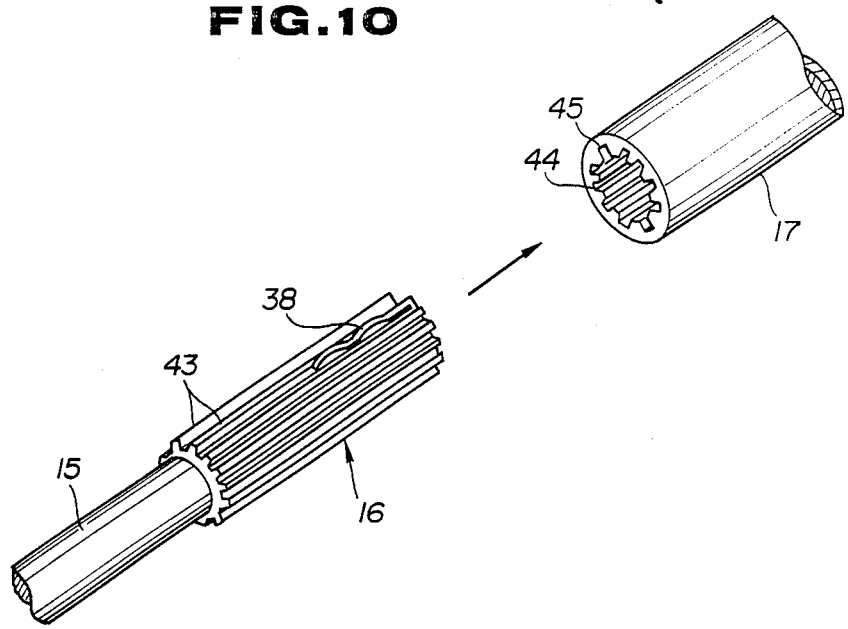
FIG. 10 is a partially perspective view of a telescopic section of the steering apparatus shown in FIG. 6.

The main difference in structure from the first preferred embodiment is that, as shown in FIG. 10, a spring member 38 is incorporated for preventing an occurrence of a play.

Figure 7:
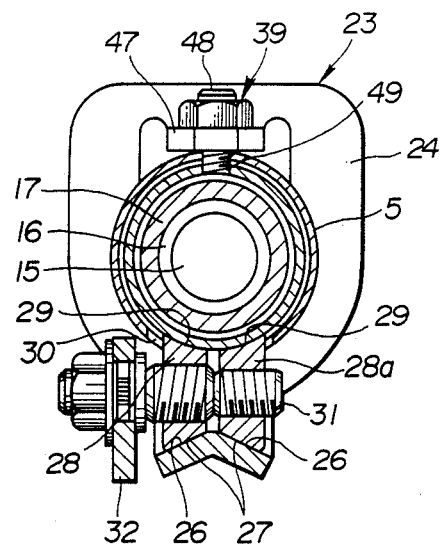
FIG. 7 is a cross sectional view of the telescopic steering apparatus cut away along the line VII—VII of FIG. 6.
Figure 8:
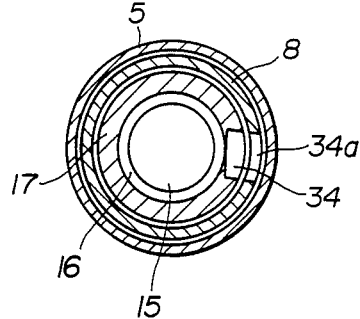
FIG. 8 is a cross sectional view of the telescopic steering apparatus cut away along the line VIII—VIII of FIG. 6.
Figure 9:
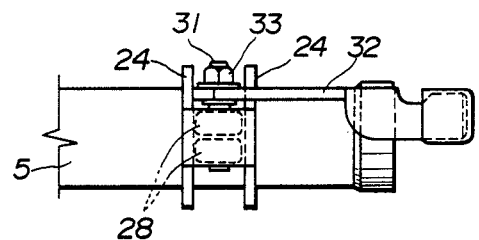
FIG. 9 is a partial view of the telescopic steering apparatus as viewed from an arrow-marked direction Y of FIG. 6.
Figure 11:
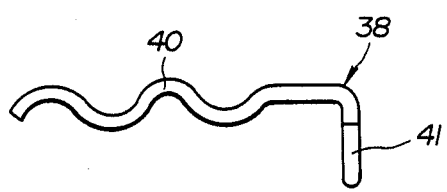
FIGS. 11 (A) and 11 (B) are side view and front view of a part of the telescopic section shown in FIG. 10.
Figure 11:
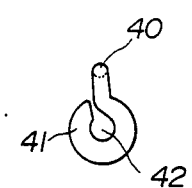
Figure 12:
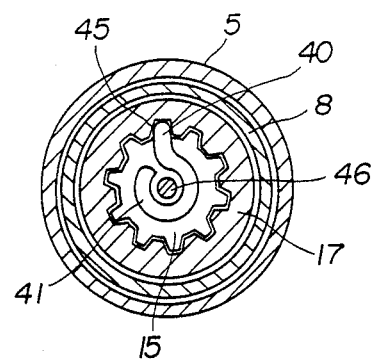
FIGS. 12 and 13 are partially cross sectional views of the telescopic section shown in FIG. 10.

In addition, as shown in FIG. 7, a lock member 39 for preventing the rotation of the inner tube 8 in the elongated direction is installed in the guide member 23. As shown in FIGS. 11(A) and 11 (B), a spring member 38 is formed of a corrugated elastic wire portion 40 and of a bis locking hole 42 formed with an annular portion 41 extended from a vertically bent end of the elastic wire portion 40.

Figure 6:
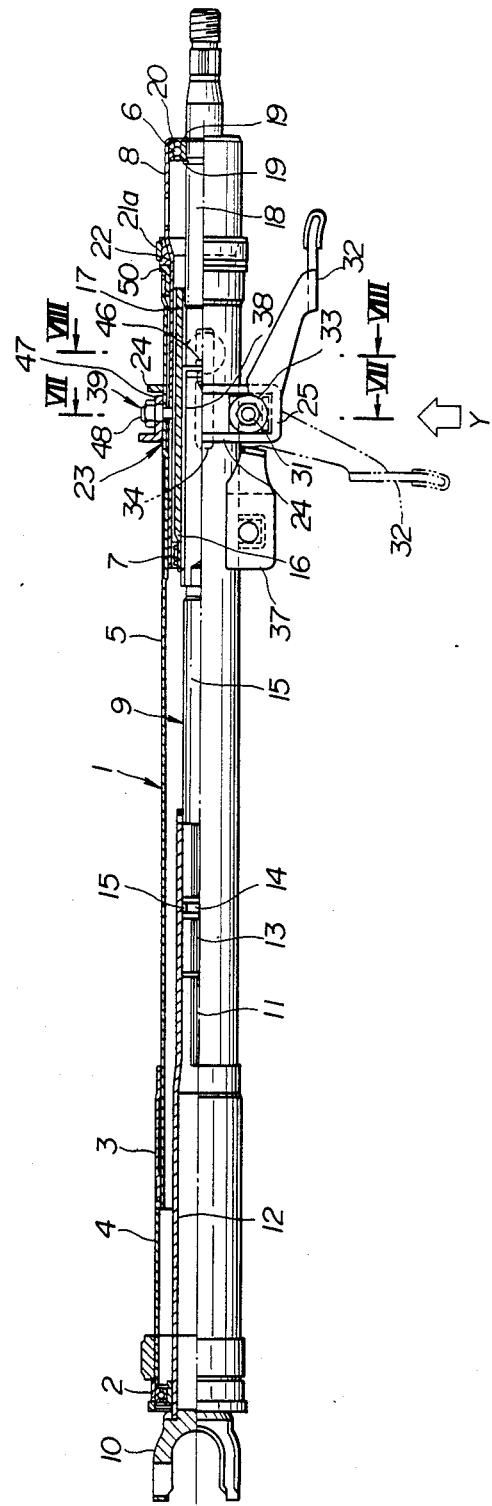
FIG. 6 is a side partially cross sectional view of the telescopic steering apparatus in a second preferred embodiment, according to the present invention.
Figure 13:
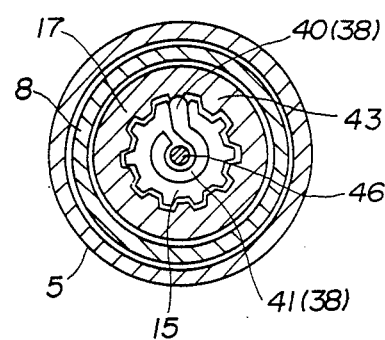
Figure 19:
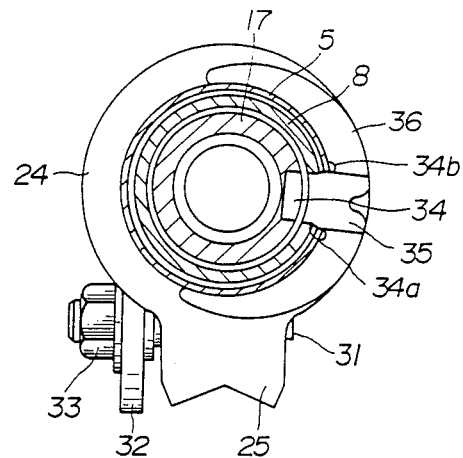
FIG. 19 is a cross sectional view of a part of the steering apparatus cut away along the line XVIV—XVIV of FIG. 16.
Figure 20:
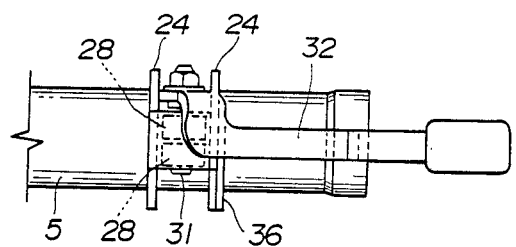
FIG. 20 is a bottom view of the part of the steering apparatus as viewed from an arrow-marked direction Z of FIG. 16.

As shown in FIG. 10, the spring member 38 is intervened between two adjacent elongated projections 43 of the shaft body 16 and inserted into a groove 45 of the cylindrical shaft 17 formed by cutting out in which one of radially extended recessed grooves 44 of the cylindrical shaft 17. The cylindrical shaft 17 slides in the axial direction of the shaft body 15. Since the spring member 38 is fixed to the shaft body 15 by means of the bis 46 as shown in FIG. 6 although the cylindrical shaft 17 slides in the axial direction of the shaft body 15, the spring member 38 will not be moved in the axial direction. As shown in FIG. 13, the spring member 38 may be fixed to the shaft body 15 in place of the projections 43 with one of the projections 43 being cut out. The lock member 39 projects a part of the guide member 23 in the axial direction along the peripheral wall of the upper jacket 5. A screw 48 is threaded into the projection 47 in the radial direction of the upper jacket 5. As shown in FIG. 7, the screw 48 is fitted into the elongated hole 49 provided on the inner tube 8 in the axial direction.

It is noted that the alleviator 22 in the second preferred embodiment is fastened to the inner tube 8 by means of a ring 21a wider than that 21 in the first preferred embodiment 8. A ring 50 having a key-shaped cross section is contacted with and separated from the alleviator 22 and is fitted to an inner periphery of the end of the inner tube 8 in both first and second preferred embodiments. A force to cause the inner tube 8 to press into the upper jacket 5 deforms the ring 50 plastically and a rate of absorbing a shock is adjusted by means of widths of the rings 21, 21a. No substantial modification to the alleviator 22 is added.

Operations of the first and second preferred embodiments will be described below.

In order to adjust telescopically the steering shaft 9, the pivotally operable member 32 is pivoted with the rod 31 as a center as denoted by a phantom line of FIGS. 1 and 6 so that the clamping members 28, 28a slide long the tapered surfaces 26, 27 to mutually separate from each other. It follows that the clamping members 28, 28a are released from contacting with the inner tube 8 under pressure. When the clamping members 28, 28a are separated from the inner tube 8, the cylindrical shaft 17, shaft body 18, and inner tube 8 are integrated via the spline portion 16 so as to become reversibly movable in the axial direction.

Therefore, an operator pulls the steering wheel toward the operator (driver) or pushes it away from the operator so that the steering wheel is placed at a desired position. After the positioning is ended, the pivotally operable member 32 is pivoted in the reverse direction to the above-described release operation.

At this time, the clamping members 28, 28a again mutually approach and are contacted with the inner tube 8 under pressure. In this way, the inner tube 8 is strongly pressed against the inner wall of the upper jacket 5. The cylindrical shaft 17, shaft body 18, and inner tube 8 are prevented from moving in the axial direction.

THIRD PREFERRED EMBODIMENT

FIGS. 14 and 15 show a third preferred embodiment of the telescopic steering apparatus according to the present invention.

In the third preferred embodiment, the present invention is applied to the tilt-type steering column.

The tilt-type steering column includes a movable bracket 52 axially supported on the bracket (not shown) fixed to the vehicle body with a tilt hinge 51 as a center and an inner tube 53, one end thereof being fixed to the movable bracket 52, an outer tube 54 to which a free end of the inner tube 53 is fitted, a cylindrical shaft 56 placed at the same level as the tilt hinge 51 and to which a deflectable and rotatable universal joint 55 is linked, a rotatable shaft body 58 which is movable in the axial direction via the cylindrical shaft 56 and spline portion 57 as a center, and the pair of clamping members 28, 28a aligned in the axial direction of the inner tube 53, penetrated through the cut-out portion 54a of the outer tube 54, and slidably contacted with the inner tube 53, and a bracket 25 which sandwiches the clamping members 28, 28a and fixes them to the outer tube 54.

It is noted that the cylindrical shaft 56 is rotatably supported on the inner tube 53 via the bearing 59 and the shaft body 58 is rotatably supported on the outer tube 54 via the bearing 61 which is locked by means of a snap ring 60. Numeral 62 denotes an alleviator fixed to a rear end of the bearing 61. The clamping members 28, 28a have the respective tapered surfaces 27, 27 which slide the tapered surfaces 26, 26 of the bracket 25. In addition, flat surfaces 29a, 29a in contact with the inner tube 53 are slidably contacted with the flat portion 53a formed in the axial direction of the inner tube 53. Furthermore, the pivotally operable member 32 fixed to the rod 31 which approaches or separates the one clamping member 28 to or from the other clamping member 28a by means of a nut 33 can be swung in a peripheral direction of the inner tube 53.

In the third preferred embodiment, when the steering shaft 9 is telescopically adjusted, the rotatably operable member 32 is pivoted in either of the forward or rearward directions with respect to the vehicle body so that the clamping members 28, 28a are mutually separated from each other. Therefore, the clamping members 28, 28a is released from the contact with the inner tube 53. That is to say, the comas 28, 28a are moved in response to the rotation of the screw 31 in the direction mutually separated along the flat portion 53a and the tapered surfaces 26, 26. The flat surfaces 29a, 29a of the comas 28, 28a are moved in the downward direction of the flat portion 53a. Consequently, the outer tube 54 is free from the inner tube 53. The cylindrical shaft 56, shaft body 58, and outer tube 54 are integrated via the spline portion 57 and can be moved in the axial direction.

FOURTH PREFERRED EMBODIMENT

FIGS. 16 to 20 show a fourth preferred embodiment of the telescopic steering apparatus according to the present invention.

Figure 21:
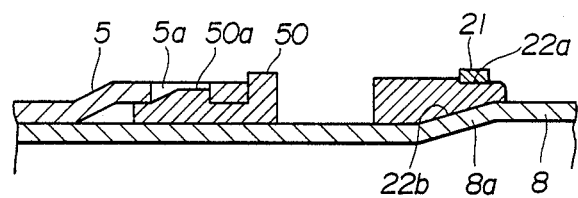
FIG. 21 is a cross sectional side view of an essential part of the telescopic steering apparatus shown in FIG. 16.
Figure 22:
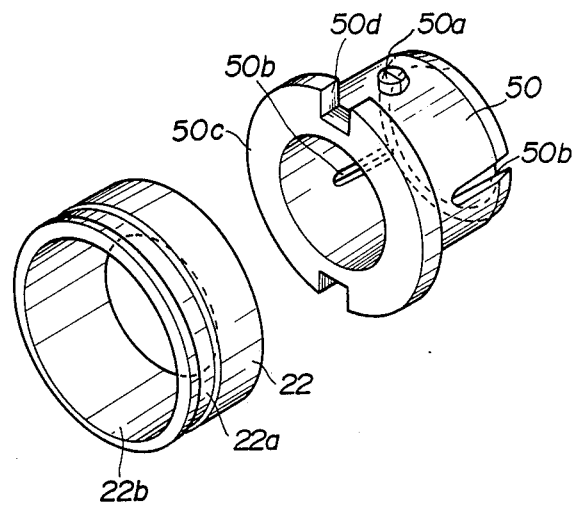
FIG. 22 is a perspective view of an essential part of the telescopic steering apparatus shown in FIG. 16.

In FIGS. 16 to 20, the same reference numerals as those shown in FIGS. 1 to 5 designate corresponding elements. The explanations of the same reference numerals as those in the first preferred embodiment are omitted here. Furthermore, in the same way as in the first preferred embodiment, another guide member 50 which is to be brought in contact with the alleviator 22 is fitted around an inclined portion 8a formed on the inner tubes 8, as shown in FIG. 21. It is noted that the alleviator 22 has an inclined tapered surface 22b on an inner peripheral surface thereof and has a peripheral groove 22a to which a ring 21 is fixed at an outer peripheral surface. The guide member 50 includes a projection 50a having a tapered surface sliding through a transparent hole 5a provided on the upper end of the upper jacket 5, axial slits 50b, 50b engaged with pins (not shown) projected on the inner peripheral surface of the upper end of the upper jacket 5, and the cut out portion 50d formed on the flange portion 50c. An outer diameter of the flange portion 50c is substantially equal to that of the alleviator 22. In the fourth preferred embodiment, a member generally denoted by numeral 37 is installed for swingably supporting the column jacket 1 on the vehicle body, i.e., a distance bracket constituting one of a tilt mechanism. A bolt 37a is disposed so as to penetrate through the distance bracket 37. The bolt 37a is grasped on the mounting bracket 37b fixed to the vehicle body and is engaged with the elongated hole installed in the longitudinal direction of the mounting bracket 37b. The bolt 37a is tightened or untightened by rotating the tilt lever 37c, so that the distance bracket 37 can be fixed at a desired upward or downward position with respect to the mounting bracket 37b. Hence, the above-described steering column constitutes so called a foot-ended steering apparatus.

FIFTH PREFERRED EMBODIMENT

FIGS. 23 to 30 show a fifth preferred embodiment of the telescopic steering apparatus according to the present invention.

The same reference numerals shown in FIGS. 23 to 30 designate corresponding elements described in the first preferred embodiment.

Figure 23:
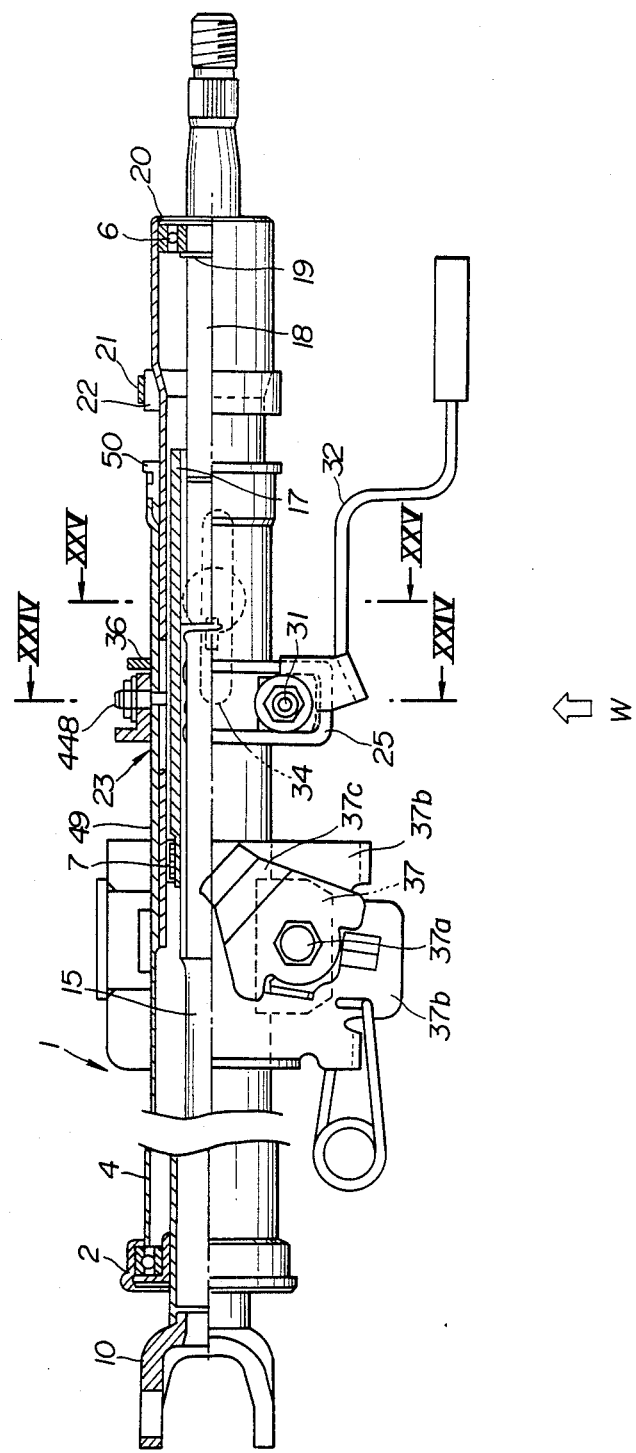
FIG. 23 is a partially cross sectional side view of the telescopic steering apparatus in a fifth preferred embodiment according to the present invention.
Figure 24:
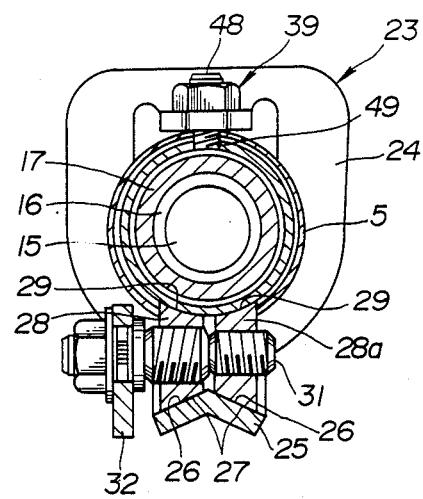
FIG. 24 is a cross sectional view of the telescopic steering apparatus cut away along the line XXIV—XXIV of FIG. 23.
Figure 25:
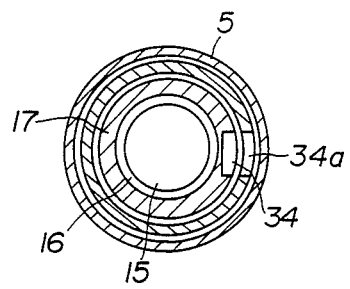
FIG. 25 is a cross sectional view of the telescopic steering apparatus cut away along the line XXV—XXV of FIG. 23.
Figure 26:
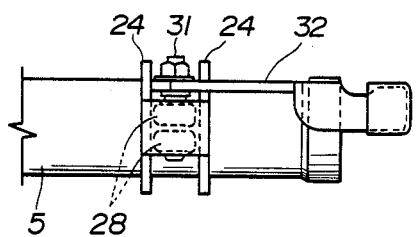
FIG. 26 is a partially bottom view of the telescopic steering apparatus as viewed from an arrow-marked direction denoted by W shown in FIG. 23.
Figure 27:
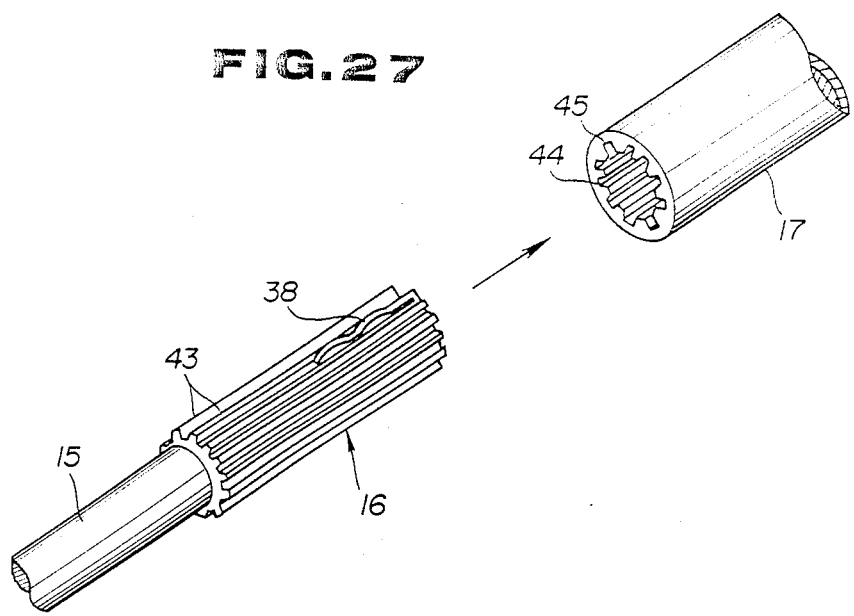
FIG. 27 is a partial perspective view of the telescopic section shown in FIG. 23.
Figure 28A:
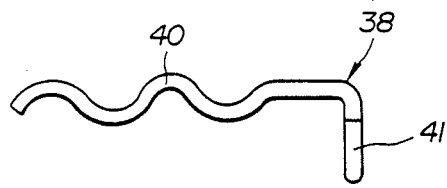
FIGS. 28 (A) and 28 (B) are side view and front view of a part of the telescopic section shown in FIG. 27.
Figure 28B:
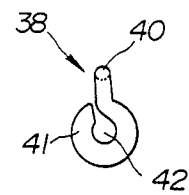
Figure 29:
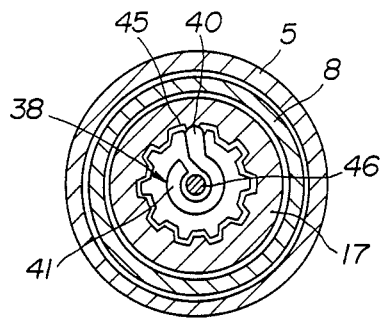
FIGS. 29 and 30 are partially cross sectional views of the telescopic sections, respectively.

In the fifth preferred embodiment, the spring member 38 is intervened in the linked end of the spline portion 16 for preventing the occurrence of the play as shown in FIG. 27. In addition, the lock member 39 of the inner tube 8 is installed in the bracket 23, as shown in FIGS. 23 and 24. This is the same way as described in the second preferred embodiment. Therefore, the structures of the spring member 38 and lock member 39 are not explained here.

Figure 30:
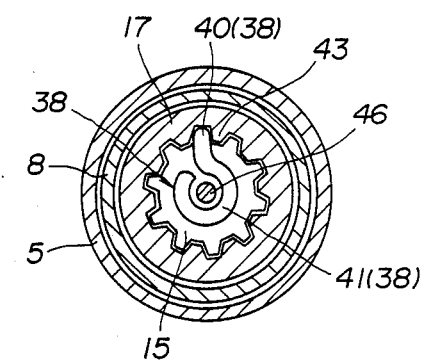

It is noted that, as shown in FIG. 30, the spring member 38 cuts out one of the projections 43 and in place of the projection 43 the spring member 38 may be fixed to the upper shaft 18.

The lock member 39 projects a part of the guide 23 in the axial direction along the peripheral wall of the upper jacket 5. The screw 48 is threaded in the radial direction of the projection 47. The screw 48 is fitted into the axially installed elongated hole 49 of the inner tube 8.

The alleviator 22 in the fifth preferred embodiment is tightened to the inner tube 8 by means of the ring 21a which is wider than the ring 21 in the fourth preferred embodiment. The alleviator 22 is contacted with or separated from the guide member 50 made of the ring-shaped material fitted into the inner periphery of the end of the inner tube 8 in the same way as in both first and second preferred embodiments. The guide member 50 is plastically deformed by means of a force pressing the inner tube 8 into the upper jacket 5 and a magnitude of absorbing the shock is adjusted by means of the width of the rings 21, 21a. No substantial modification is made for the alleviator 22 itself.

The operations of the fourth and fifth preferred embodiments will be described below.

To make the telescopic adjustment of the steering shaft 9, the rotatably operable member 32 is pivoted on the rod 31 as shown in a phantom line of FIGS. 16 and 23. The clamping members 28, 28a are slided along the tapered surfaces 26, 27 so as to separate from each other. Consequently, the clamping members 28, 28a are released from contacting with the inner tube 8 under pressure. When the clamping members 28, 28a are separated from the inner tube 8, the cylindrical shaft 17, upper shaft 18, and inner tube 8 are integrated and become reversibly movable in the axial direction. After the steering wheel is pulled toward the driver or pushed away from the driver so that the desired driving position is determined, the pivotally operable member 32 is pivoted in the reverse direction to the pivoting. Hence, the clamping members 28, 28a are mutually approached and brought in contact with the inner tube 8, respectively. Thus, the inner tube 8 is strongly pressed against the inner wall of the upper jacket 5. The cylindrical shaft 17, upper shaft 18, and inner tube 8 do not move in the axial direction.

During the above-described telescopic adjustment, the inner tube 8 is retracted in the upper jacket 5 at its maximum. At this time, the alleviator 22 collides with the guide member 50 with shock. However, since the alleviator 22 is made of the elastic member, the shock can be relieved and absorbed. No damage and no metallic sound upon collision do not occur. The inner tube 8 can thus smoothly be drawn in the upper jacket 5.

SIXTH PREFERRED EMBODIMENT

Figure 31:
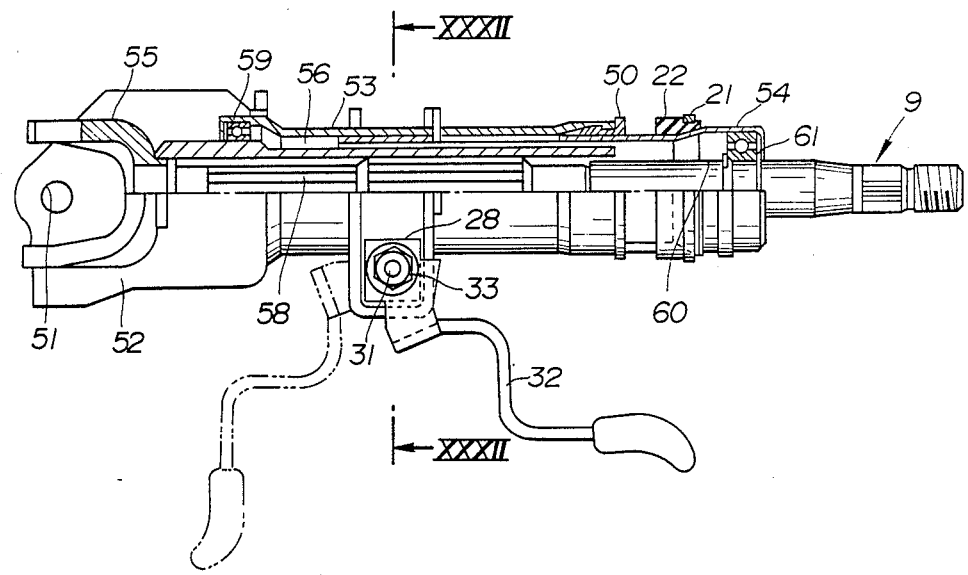
FIG. 31 is a partially sectional side view of the telescopic steering apparatus in a sixth preferred embodiment according to the present invention.
Figure 32:
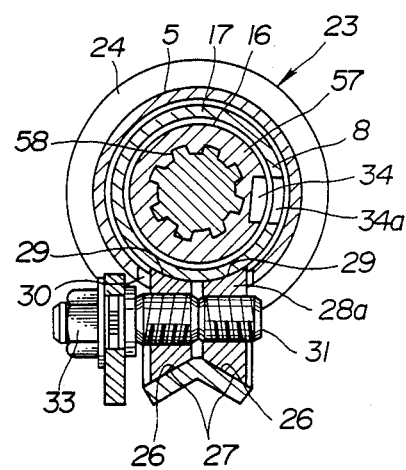
FIG. 32 is a cross sectional view of the telescopic steering apparatus cut away along the line XXXII—XXXII of FIG. 31.

FIGS. 31 and 32 show a sixth preferred embodiment of the telescopic steering apparatus according to the present invention.

In the sixth preferred embodiment, the present invention is applied to a so called hand-ended tilt-type steering column.

The steering column includes the movable bracket 52 axially supported on the bracket (not shown) fixed to the vehicle body with the tilt hinge 51 as a center, the upper jacket (inner tube) 53, one end thereof being fixed to the movable bracket 52, the outer tube 54 fitted to the free end of the upper jacket 53, the inner tube 54 fitted to the free end of the upper jacket 53, the cylindrical shaft 56 placed at the same level as the tilt hinge 51 and to which the deflectable and rotatable universal joints 55 are linked, the upper shaft 58 which is movable in the axial direction via the spline portion 57 and is rotatable with the axis thereof as a center, the pair of clamping members 28, 28a which is aligned in its peripheral direction and which is penetrated through the cut-out portion 54a of the outer tube 54, and the bracket 25 sandwiched with the clamping members 28, 28a and fixed to the inner tube 54 substantially in the same way as described in the third preferred embodiment.

It is noted that the cylindrical shaft 56 is rotatably supported to the upper jacket 53 via a bearing 59 and the upper shaft 58 is rotatably supported on a bearing 61 locked by the snap ring 60.

The clamping members 28, 28a have the tapered surfaces 27, 27 slidably contacting with the opposing tapered surfaces 26, 26 of the bracket 25. Curved surfaces 29a, 29a of the clamping members 28, 28a are slidably contacted with the peripheral surface of the inner tube 54. Furthermore, the rotatably operable member 32 fixed by means of the nut 33 to the rod 31 which operatively makes mutual approaches of the clamping members 28, 28a or mutual separations of the comas 28, 28a can be swung forward and rearward of the axial direction of the upper jacket 53.

In this embodiment, the alleviator 22 is fixed to an upper end of the inner tube 54. In addition, the guide member 50 is fixed on the inner peripheral surface of the upper end of the upper jacket 53, respectively.

In the sixth preferred embodiment, to adjust telescopically the steering shaft, the pivotally operable member 32 is pivoted in either of the forward and rearward directions so that the clamping members 28, 28a are mutually separated from each other. Thus, the clamping members 28, 28a are released from the inner tube 54. That is to say, the rotation of the screw 31 causes the clamping members 28, 28a to be separated from each other along the tapered surfaces 26, 26. The curved surfaces 29a, 29a of the clamping surfaces 28, 28a moves downward of the inner tube 54, thus the inner tube 54 being free from the upper jacket 53. The cylindrical shaft 56, upper shaft 58, and inner tube 54 are integrally movable in the axial direction. Thus, when the inner tube 54 is pressed under pressure into the upper jacket 53 at its maximum, the alleviator 22 serves to damp the shock upon collision and brought in smooth contact with the guide member 50. Thus, no shock occurs.

SEVENTH PREFERRED EMBODIMENT

FIGS. 33 to 43 show a seventh preferred embodiment of the telescopic steering apparatus according to the present invention.

The same reference numerals as those shown in the fourth preferred embodiment designate corresponding elements.

It is noted that in the seventh preferred embodiment, the other end of the upper tube (upper jacket) 5 is fixed to an upper clamp 90.

It is also noted that the steering shaft 9 includes the upper shaft 118, one end thereof being inserted into the other end of the lower shaft 14. The other end of the second upper shaft is formed of a spline portion 119. The spline portion 119 is engaged with a spline portion 120 formed on an inner periphery of the telescopic sleeve (cylindrical shaft) 17.

As shown in FIG. 35, the telescopic sleeve 17 and telescopic shaft (upper shaft) 18 are integrated and coaxially inserted into the telescopic upper jacket 8. They are rotatably inserted into the upper jacket 5 so as to enable movement along the upper jacket 5 with the range of the spline portions 119 and 120.

Figure 37:
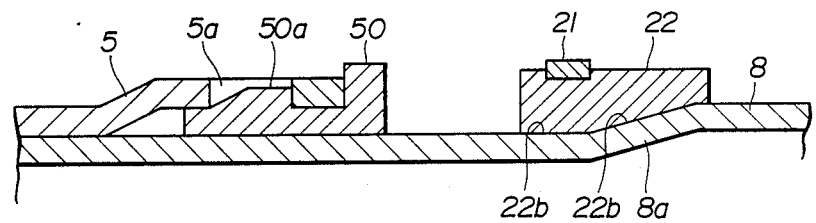
FIG. 37 is a partial cross sectional view of an essential part of the steering apparatus shown in FIG. 33.

Furthermore, as shown in FIG. 37, the upper end of the telescopic upper jacket (inner tube) 8 is formed of the inclined portion 8a to which the alleviator 22 is unmovably fitted via a ring 225 placed on a center part of the outer periphery thereof.

The steering apparatus in the seventh preferred embodiment constitutes the so-called foot-ended tilt-type steering apparatus.

As shown in FIG. 38, the axial end 118a of the telescopic sleeve (cylindrical shaft) 118 is cut in substantially truncated cone shape and a damper 448 made of an elastic material of a polyurethane series is attached to the telescopic shaft (upper shaft) 18. As shown in FIG. 39, the damper 448 is a cylindrical body formed with tapered portions 449, 449 on inner peripheral surfaces of both axial ends thereof. In addition, an axial hole 550 is provided in the damper 448 having a diameter substantially equal to that of an upper bottom portion 118b of the axial end portion 118a. It is noted that the axial length $L_1$ of the axial end portion 118a has a relationship to the axial length $L_2$ of the damper 448 in the following inequality: $L_2 > L_1$. Furthermore, a space length $L_3$ between the axial end portion 118a and damper 448 is set to the following relationship: $L_3 > 0$ (i.e., $L_3 > L_4$) when a space length $L_4$ between the alleviator 22 and guide member (stopper) 50 is zero.

Figure 40:
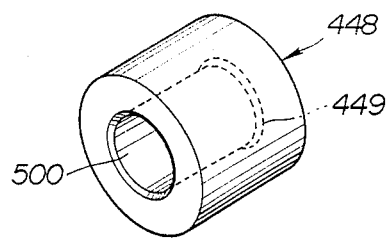
FIG. 40 is a perspective view of an essential member of the steering apparatus shown in FIG. 33.
Figures 41A, 41B, 41C:
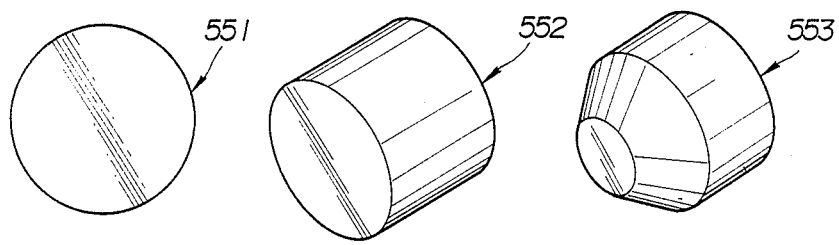
FIGS. 41 (A) to 41 (E) are perspective views of modifications of the essential member shown in FIG. 40.
Figures 41D, 41E:
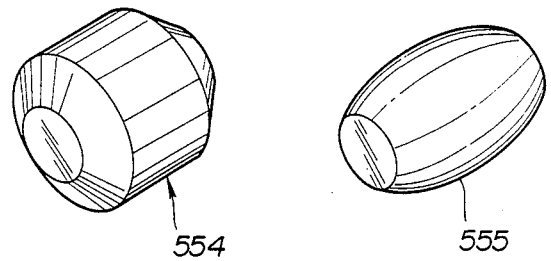

The damper 448 may alternatively be constituted by a ball-shaped (spherical member) body 551 as shown in FIG. 40 (A), by a cylindrical body 552 as shown in FIG. 40 (B), by a cylindrical truncated cone body 553 integral with the cylindrical body and truncated cone body as shown in FIG. 40 (C), a bell-shaped body 554 integral with the two truncated cone bodies as shown in FIG. 40 (D), or a drum-shaped body 550 as shown in FIG. 40 (E). Furthermore, the damper 448 may be constituted by a hollow or foreign matter contained spherical body 551.

In the seventh preferred embodiment, when an accident of collision of the vehicle with an object and a secondary accident of collision of the steering apparatus with the driver occur, a shock load upon collision on the steering wheel is inputted to the telescopic shaft 18 and the inner tube (telescopic upper jacket) 8. The telescopic sleeve 118, telescopic upper shaft 18, and telescopic upper jacket 8 are integrally moved in the telescopic lower jacket 17 against a grasping force of the clamping members 28, 28a so that the exposed length of the telescopic mechanism becomes short.

As shown in (1) of FIG. 42 (A), the alleviator 22 is aligned with the guide member 50 so as to press the upper shaft 5. However, since the telescopic shaft 18 has the gap $L_3$ against the axial end 118a of the upper shaft 118, the telescopic shaft 18 does not collide with the upper shaft 118. In addition, since the alleviator 22 has a maximum thickness portion grasped by means of a grasping ring 225 and fixed to the telescopic upper jacket 8, the alleviator 22 can be plastically deformed and be held at the inclined portion 8a without displacement.

Next, as shown in (2) of FIG. 42 (B), together with the upper clamp 90 from the vehicle body, the upper tube 5 is moved in the lower tube 4 so that the length of the whole column jacket 1 becomes short. Hence, as shown in (3) of FIG. 42 (C), the damper 448 of the telescopic upper shaft 18 is contacted with the axial end 118a of the upper shaft 118.

As shown in FIG. 39, the axial hole 550 of the damper 448 is diametrically expanded and fits the upper shaft 118 thereto. The peripheral side surface of the diametrically expanded damper 448 is contacted with the inner peripheral surface of the telescopic sleeve 17, i.e., the grooves of the spline portions 119 and 120 under pressure so as to generate a frictional resistance.

Thus, as shown in (4) of FIG. 42 (C), the upper shaft 118 is pressed by means of the telescopic upper shaft 18 and is moved into the lower shaft 12. Consequently, the exposed length of the steering shaft 9 becomes short.

Figure 43:
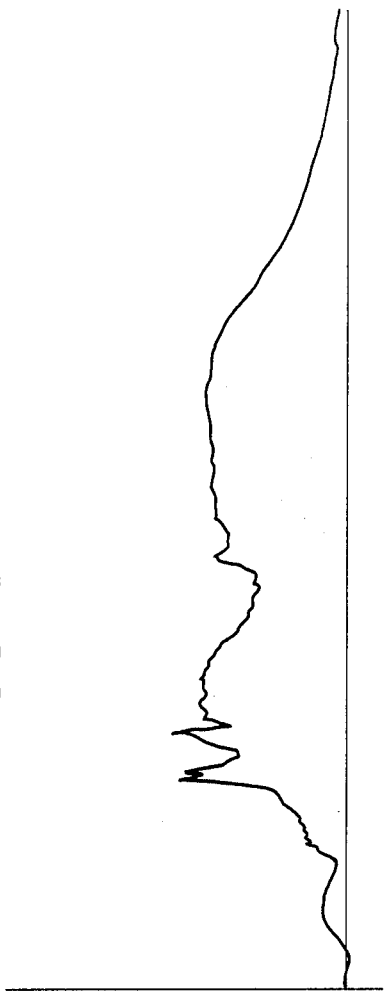
FIG. 43 is a characteristic graph representing a load applied to the steering apparatus shown in FIG. 33.

In this way, due to the resistance generated by the presence of the gap $L_3$ and by diametrically expanded damper 448, a timing at which the telescopic shaft 18 pushes the bottom of the upper shaft 118 is deviated from timings at which the upper clamp 90 is separated from the vehicle body and the whole column jacket 1 becomes short. Although a peak load is generated, the peak load can be suppressed and the increase of the maximum generation load generated at the simultaneous occurrence of the above-described timings can be prevented, as shown in FIG. 43.

EIGHTH PREFERRED EMBODIMENT

FIGS. 44 to 49 show an eighth preferred embodiment of the telescopic steering apparatus according to the present invention.

The same reference numerals shown in the eighth preferred embodiment designate corresponding elements in the previous preferred embodiment.

In the eighth preferred embodiment, the spline portion 16 is formed of the projections 16a and groove portions 16b engaged with the projections 16a and continuously formed in the circumferential direction. An axially recessed portion 16c is formed with one of the projections 16a eliminated at the inner peripheral surface of the telescopic sleeve 17 opposing the key lock groove 34. One of the groove portions 16b opposing the recessed portion 16c is formed of an axial projection 16d whose top end is slidably contacted with the recessed portion 16c.

Figure 46A:
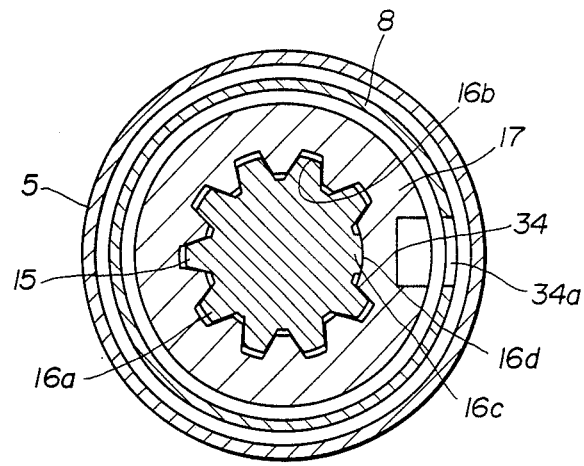
FIGS. 46 (A) and 46 (B) are cross sectional views of a part of the steering apparatus cut away along a line XXXXVI—XXXXVI of FIG. 44.
Figure 46B:
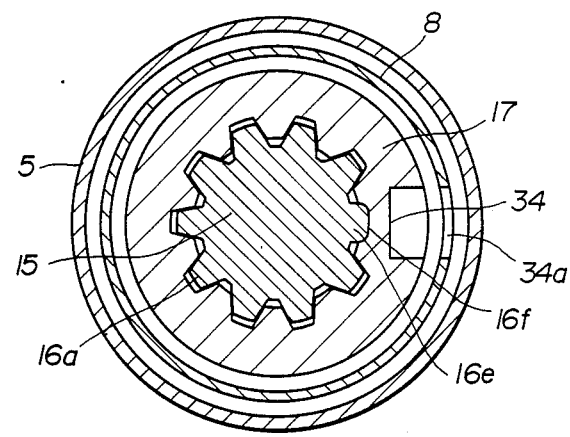

It is noted that, as shown in FIG. 46 (B), one of the projections 16e is substantially half the depth of the other grooved portions 16b. The projection 16f may axially be formed and the top ends of one of the projections 16b and the projection 16f may slidably be contacted with each other.

In addition, the groove portion 16d, 16f in the spline portion 16 have depthes shallower than the other groove portion 16b. The spline portion 16 of the upper shaft 15 to be engaged with the shallow grooves 16d, 16f is thus formed of the projections 16c, 16e lower than the other projections 16a.

Figure 48:
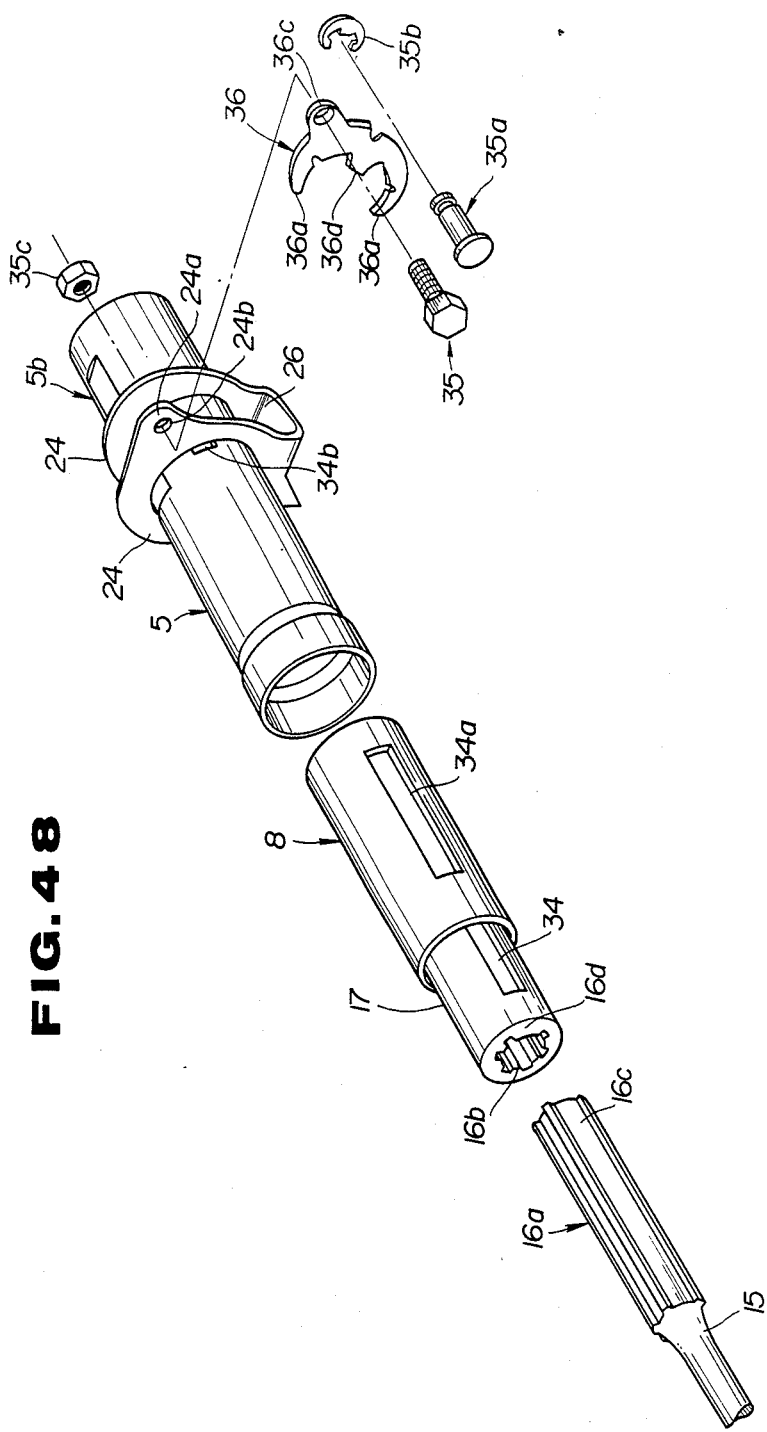
FIG. 48 is an essential part perspective view shown in FIG. 44.

As shown in FIG. 48, a recessed portion 5b is formed on an outer peripheral surface in the axial direction of the upper tube 5. The bracket 23 constituting the telescopic lock portion is fixed in the vicinity of the end of the upper tube 5. The bracket 23 includes an extended portion 24a projected toward one of the two pieces of the flange-shaped portions 24 and a hole 24b installed on the extended portion 24a for inserting a bolt thereinto. The pair of tapered surfaces 26, 26 formed so as to oppose the inner bottom surface of the groove-shaped portion 25 integral with the flange-shaped portion 24.

Figure 47:
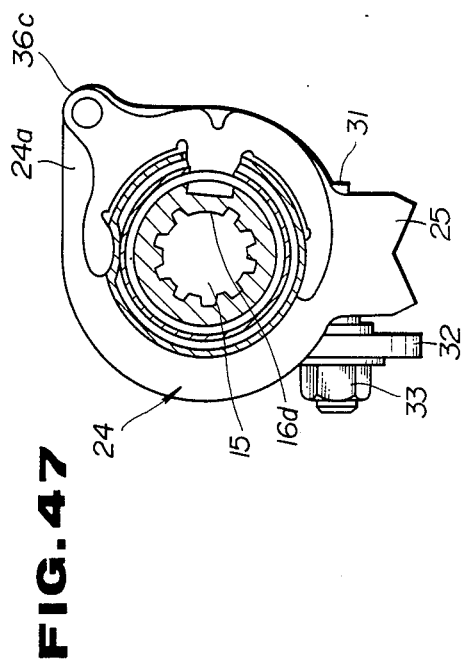
FIG. 47 is a cross sectional view of a part of the steering apparatus cut away along a line XXXXVII—XXXXVII of FIG. 44.

As shown in FIG. 47, the E-ring shaped telescopic stopper (lock member) 36 is fitted to the upper jacket 5.

Figure 49:
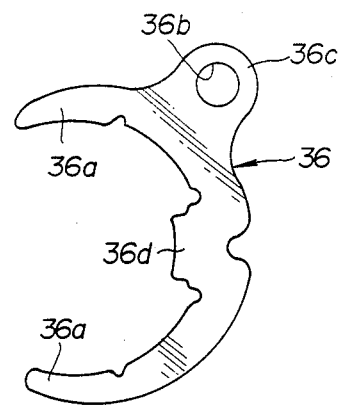
FIG. 49 is a elevational view of a telescopic stopper shown in FIG. 44.

The telescopic stopper 36, as shown in FIGS. 48 and 49, is fitted in orthogonal to the axial line of the upper tube 5. Pawls 36a, 36a, one of which is engaged with the recessed portion 5b of the upper tube 5, is formed so as to slightly extend in the inner peripheral direction, as shown in FIG. 47. A projected portion 36d located substantially at a center of the inner peripheral portion and an extended portion 36c having a hole for inserting a bolt thereinto at its outer periphery are integrally formed. The recessed portion 5b may be formed so as to oppose against each other in the diametrical direction. The extended portion 36c can be faced with the extended portion 24 of the bracket 23. The hole 36b can be aligned with the hole 24b. The bolt 35 or pin 35a can be inserted in the holes 24b, 36b. The bolt is fastened by means of a nut 35c at the bracket 23. Alternatively, the pin 35a is fixed to the E-ring 35b. The bolt 37a penetrated through the bracket 37 is engaged with the elongated hole installed in the longitudinal direction of the clamp 37b. The telescopic steering apparatus in the eighth preferred embodiment constitutes the foot-ended tilt-type steering apparatus.

NINTH PREFERRED EMBODIMENT

Figure 50:
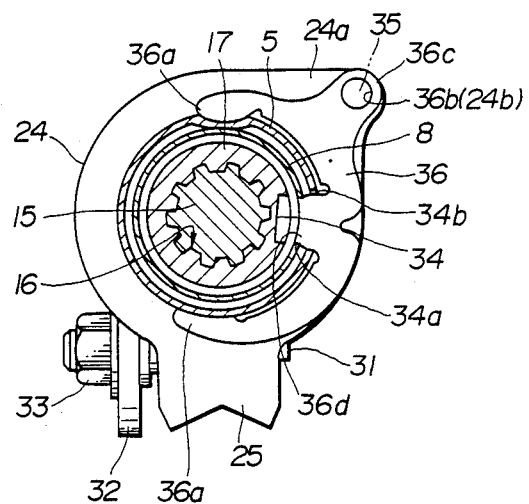
FIG. 50 is a cross sectional view of the steering apparatus in a ninth preferred embodiment according to the present invention.

FIG. 50 shows a ninth preferred embodiment of the telescopic steering apparatus according to the present invention.

The structure of the steering apparatus in the ninth preferred embodiment is substantially the same as that in the eighth preferred embodiment.

Figure 36:
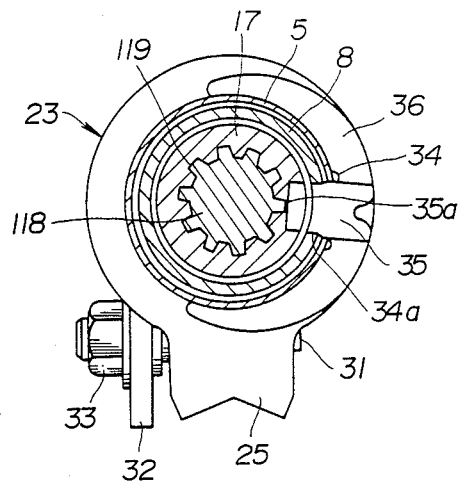
FIG. 36 is a cross sectional view of the steering apparatus cut away along a line XXXVI—XXXVI of FIG. 33.

However, as shown in FIG. 50, the upper shaft 15 is axially and movably inserted into the telescopic sleeve 17 via the spline portion 16, as compared with FIG. 36 and with FIG. 47.

The telescopic steering apparatus in the ninth preferred embodiment constitutes the foot-ended tilt-type steering apparatus.

As described hereinabove, since the pair of comas are inserted so as to enable the approach or separate from the outside of the column jacket with respect to the telescopic portion of the axially telescopic column jacket, the tapered surface is formed on the clamping members, the guide member having the tapered surface which slides on the tapered surface is fixed to the column jacket, and the screw engaged with the clamping members and the pivotably operable member is installed with the end of the screw fixed thereto, the operation of the pivotally operable member causes the clamping members to be contacted with the telescopic portion of the column jacket under pressure. The frictional engagement of the telescopic portion firmly fixes the length of the telescopic portion. In addition, if the telescopic portion is extended at its maximum, the reduction of rigidity is minute.

Furthermore, since in the telescopic steering apparatus according to the present invention, the ring shaped guide member is fitted and fixed to the inner peripheral surface of the upper end of the upper jacket and the alleviator made of the elastic ring-shaped member is fitted to the outer peripheral surface of the upper end of the inner shaft, a smooth telescopic adjustment can be made with no shock and no shock sound when both inner tube and upper jacket are retracted within the upper jacket. In addition, since the alleviator and guide member can be extremely compact, the telescopic steering apparatus can be inexpensive.

What is claimed is:

1. A structure of a telescopic steering apparatus, comprising:
   (a) a steering column jacket having a first fixed portion and a second movable portion which is linked to the first portion and is movable in an axial direction thereof;
   (b) a steering shaft having a third portion rotatably fitted to the first fixed portion of the column jacket and fourth portion which is linked to the third portion and is movable in the axial direction of the column jacket within a predetermined range of movement;
   (c) first means for operatively fixing and unfixing the second portion to the first portion; and
   (d) second means fixed to the first portion for guiding the first means to the second portion via the first portion.

2. A structure as set forth in claim 1, wherein the fourth portion of the steering shaft is rotatably fixed to the second portion of the column jacket.

3. A structure as set forth in claim 2, wherein the second means is located around an end of the first portion of the column jacket adjacent to the second portion which is moved at substantially maximum axial position of the predetermined range of movement.

4. A structure as set forth in claim 3, wherein a free end of the fourth portion of the steering shaft is provided with a steering wheel.

5. A structure as set forth in claim 4, wherein the steering column jacket is fixed to a predetermined position of a vehicle.

6. A structure as set forth in claim 1, which further comprises a lock member for preventing a rotation of the second portion of the column jacket.

7. A structure as set forth in claim 6, wherein the lock member comprises an E-ring shaped lock member having a projection at a center portion thereof and attached to the outer periphery of the first portion of the column jacket via a slit formed through the second portion.

8. A structure as set forth in claim 1, which further comprises a spline portion which links the third portion and fourth portion of the steering shaft and wherein the predetermined range of movement of the fourth portion is defined by a dimension of the spline portion.

9. A structure as set forth in claim 8, which further comprises a spring member for preventing an occurrence of a play in the spline portion and a lock member installed on the second means for preventing the rotation of the second portion of the column jacket.

10. A structure as set forth in claim 1, wherein the first portion of the column jacket is fixed to a movable bracket member tiltable with respect to a predetermined position of a vehicle body.

11. A structure as set forth in claim 1, wherein the second portion of the column jacket is coaxially supported on the third portion, a steering wheel is fixed to a free end of the fourth portion, a guide member is fitted around an inner peripheral surface of one end of the first portion which faces toward the free end of the fourth portion, and alleviator is fitted around an outer peripheral surface of the second portion located in the vicinity of the free end of the fourth portion, the alleviator being brought in contact with the guide member with a damped shock.

12. A structure as set forth in claim 11, wherein the alleviator is made of an elastic material and is fitted around the outer periphery of the second portion which is slanted to face against the guide member.

13. A structure as set forth in claim 12, wherein the elastic material is an annular rubber.

14. A structure as set forth in claim 12, wherein the elastic material is a urethane.

15. A structure as set forth in claim 12, wherein the guide member comprises a projection portion having a tapered surface for guidably fitting the projection portion into a hole penetrated through the first portion, a plurality of slits, and a flange portion facing toward the alleviator and having an outer diameter substantially equal to that of the alleviator.

16. A structure as set forth in claim 11, which further comprises an annular ring fitted around the outer periphery of the alleviator, a width thereof defining a degree of absorbing a shock.

17. A structure as set forth in claim 12, wherein the guide member is made of a resin.

18. A structure of a telescopic steering apparatus, comprising:
   (a) a steering column jacket having a first fixed portion and a second movable portion which is linked to the first portion and is movable in an axial direction thereof;
   (b) a steering shaft having a third portion rotatably fitted to the first fixed portion of the column jacket and fourth portion which is linked to the third portion and is movable in the axial direction of the column jacket within a predetermined range of movement;
   (c) first means for operatively fixing and unfixing the second portion to the first portion; and
   (d) second means fixed to the first portion for guiding the first means to the second portion via the first portion, wherein the second means comprises: (a) a first member fitting the first portion of the column jacket and having a first pair of tapered surfaces; and (b) a cut-out hole penetrated through a predetermined position of the first portion so that the first means can be moved to fix and unfix the second portion to the first portion within the predetermined range of movement of the fourth portion.

19. A structure as set forth in claim 18, wherein the first means comprises: (a) a pair of mutually juxtaposed second members movably mounted on the first member having a second pair of tapered surfaces at respective one end thereof which are slidably contacted with the first pair of tapered surfaces of the first member, respectively, and having a curved surface at the other end of each second member opposite to the corresponding tapered surface thereof, the curved surfaces of the pair of the second members being brought in contact with an outer periphery of the second portion under pressure via the cut-out hole; (b) a screw member penetrated through the pair of second members and having one half threaded portion penetrated through one of the pair of second members and the other half threaded portion penetrated through the other of the pair of second members and which is turnable in a direction opposite to the one half threaded portion; and (c) a pivotally operable member for operatively turning the screw member so that the curved surfaces of the pair of second members approach the opposite parts of the outer peripheral surface of the second portion when the pivotally operable member is pivoted at a first position and separate from the opposite parts of the outer peripheral surface of the second portion when the pivotally operable member is pivoted at a second position opposite to the first position.

20. A structure as set forth in claim 19, wherein the pair of second members are inserted through the cut-out hole orthogonal to an axial line of the column jacket.

* * * * *